US008452482B2

(12) United States Patent
Cramer et al.

(10) Patent No.: US 8,452,482 B2
(45) Date of Patent: May 28, 2013

(54) SELF TESTING SYSTEMS AND METHODS

(75) Inventors: Christina Cramer, Rochester, MI (US); Matthew R. Malik, Highland, MI (US); Timothy P. Philippart, Orion, MI (US)

(73) Assignee: GM Global Technology Operations LLC

( * ) Notice: Subject to any disclaimer, the term of this patent is extended or adjusted under 35 U.S.C. 154(b) by 619 days.

(21) Appl. No.: 12/711,532

(22) Filed: Feb. 24, 2010

(65) Prior Publication Data

US 2011/0144854 A1 Jun. 16, 2011

Related U.S. Application Data

(60) Provisional application No. 61/285,350, filed on Dec. 10, 2009.

(51) Int. Cl.
*G01M 17/00* (2006.01)

(52) U.S. Cl.
USPC .......................................... 701/31.4; 340/438

(58) Field of Classification Search
USPC ............... 701/31.4, 30.8, 30.7, 29.1, 114, 36, 701/102, 49; 714/23; 340/438; 379/2
See application file for complete search history.

(56) References Cited

U.S. PATENT DOCUMENTS

2010/0023203 A1* 1/2010 Shibi ............................... 701/33

* cited by examiner

*Primary Examiner* — Thomas Black
*Assistant Examiner* — Luke Huynh

(57) ABSTRACT

A diagnostic system for a vehicle comprises a diagnostic module, a control module, and a hardware interface module. The diagnostic module selectively diagnoses a fault in one or more of components that are integrated within a housing. The control module receives a request for testing of the diagnostic module and retrieves predetermined fault data corresponding to the fault. The hardware interface module receives component data for the diagnosis and the predetermined fault data, disables provision of the component data to the diagnostic module, and provides the predetermined fault data to the diagnostic module for the diagnosis.

20 Claims, 3 Drawing Sheets

SELF TESTING SYSTEMS AND METHODS

CROSS-REFERENCE TO RELATED APPLICATIONS

This application claims the benefit of U.S. Provisional Application No. 61/285,350, filed on Dec. 10, 2009. The disclosure of the above application is incorporated herein by reference in its entirety.

FIELD

The present disclosure relates to control systems and methods for vehicles and more particularly to diagnostic validation systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include various electrical and electro-mechanical components. For example only, a vehicle may include a variety of sensors, actuators, and other components. A diagnostic module may determine whether one or more components are reliable or faulty.

For example only, the diagnostic module may diagnose an out of range fault in a given sensor when the sensor outputs a signal that is outside of a predetermined operating range for the sensor. The diagnostic module may diagnose an out of correlation fault in a given sensor when the sensor outputs a signal that differs from an expected signal by more than predetermined amount or percentage.

When one or more faults have been diagnosed in a vehicle, one or more remedial actions may be taken. For example only, the diagnostic module may set a predetermined code in memory when a fault is diagnosed. The diagnostic module may also illuminate a fault indicator, such as a malfunction indicator lamp, when one or more faults have been diagnosed.

SUMMARY

A diagnostic system for a vehicle comprises a diagnostic module, a control module, and a hardware interface module. The diagnostic module selectively diagnoses a fault in one or more of components that are integrated within a housing. The control module receives a request for testing of the diagnostic module and retrieves predetermined fault data corresponding to the fault. The hardware interface module receives component data for the diagnosis and the predetermined fault data, disables provision of the component data to the diagnostic module, and provides the predetermined fault data to the diagnostic module for the diagnosis.

A diagnostic method for a vehicle comprises: selectively diagnosing a fault in one or more of components that are integrated within a housing a diagnostic module; receiving a request for testing of the diagnostic module; retrieving predetermined fault data corresponding to the fault; receiving component data for the diagnosing and the predetermined fault data; disabling provision of the component data to the diagnostic module; and providing the predetermined fault data to the diagnostic module for the diagnosing.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
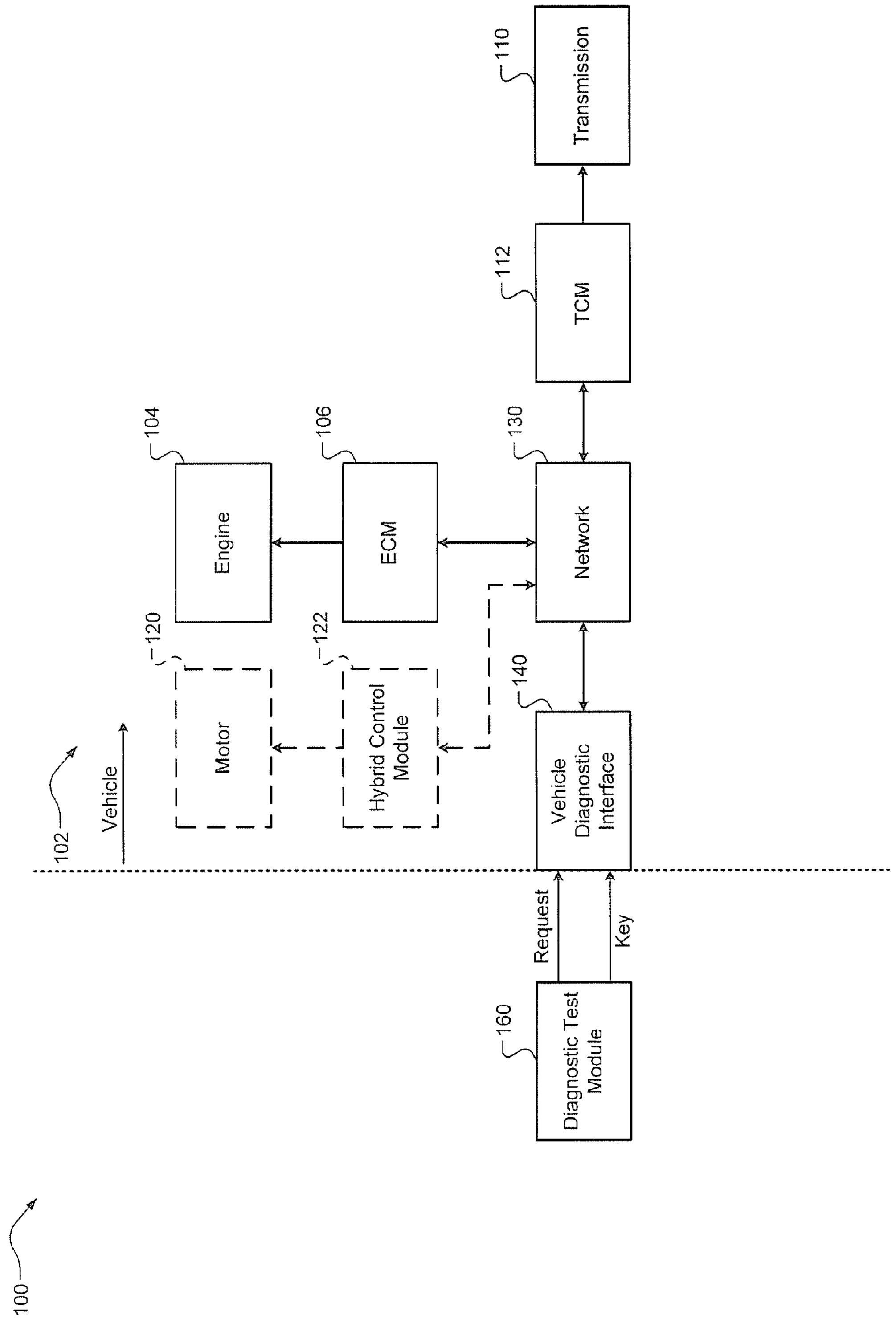
FIG. 1 is a functional block diagram of an exemplary implementation of a vehicle diagnostic system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A diagnostic module of a vehicle may determine whether one or more faults are present. The diagnostic module may use one or more predetermined parameters in determining whether a given fault is present. The diagnostic module may take one or more remedial actions when a fault is present. For example only, the diagnostic module may store a predetermined code associated with the fault in memory, illuminate an indicator lamp, and/or take other suitable remedial actions.

In some circumstances, performance of the diagnostic module may be tested. More specifically, whether the diagnostic module diagnoses a fault when presented with data that is indicative of the fault may be tested. For example only, a component may be electrically disconnected, and the diagnostic module may be presented with one or more signals that should cause the diagnostic module to diagnose the fault. One or more components, however, may be integrated with the diagnostic module within a housing and/or may be unavailable for electrical disconnection.

A hardware interface module provides an input/output (I/O) interface between a control module and the one or more integrated components. When a request for testing of the diagnostic module is received, the hardware interface module provides data indicative of a fault to the diagnostic module. In some implementations, the control module may monitor the response of the diagnostic module to the data and may diagnose a fault in the diagnostic module when the diagnostic module fails to diagnose the fault. In other implementations, the indicator lamp may be visually monitored to determine whether the diagnostic module diagnoses the fault.

Referring now to FIG. 1, a functional block diagram of an exemplary implementation of a vehicle diagnostic system 100 is presented. A vehicle 102 may include an engine 104 that combusts a mixture of air and fuel to produce drive torque. An ECM 106 may control the torque output of the engine 104.

Torque output by the engine 104 may be selectively transferred to a transmission 110. A transmission control module (TCM) 112 may control operation of the transmission 110, such as gear ratio selected within the transmission 110, and other suitable parameters. The TCM 112 may also control parameters associated with transferring torque between the engine 104 and the transmission 110, such as slip of a torque converter clutch (not shown).

One or more components associated with the transmission 110 may also be integrated within the TCM 112. For example only, one or more sensors, one or more actuators, one or more connectors, and other suitable components may be integrated within the TCM 112. The actuators may include, for example, solenoids, switches, valves, and other suitable actuators. The sensors may include, for example, temperature sensors, pressure sensors, position sensors, speed sensors, and other suitable sensors. The connectors may include, for example, hydraulic fluid connectors, electrical connectors, and other suitable connectors. The actuators, sensors, connections, and other components are generally electrically inaccessible from outside of a housing of the TCM 112. The TCM 112 may commonly be referred to as a transmission electro-hydraulic control module (TEHCM) when located within the transmission 110.

The vehicle 102 may also include one or more electric motors or motor generator units 120. A hybrid control module 122 may control the one or more electric motors or motor generator units 120. The motor generator units 120 may be used to produce torque, to perform regenerative braking and produce electrical energy for the vehicle 102, and/or to perform other suitable functions.

The ECM 106, the TCM 112, and other vehicle systems may communicate via a network 130. Devices that are independent of (i.e., external to) the vehicle 102 may interface the network 130 via a vehicle diagnostic interface 140. The vehicle diagnostic interface 140 may include a physical I/O interface, a wireless I/O interface, or another suitable type of I/O interface.

For example only, a diagnostic scan tool (not shown) may interface the network 130, and more particularly memory, via the vehicle diagnostic interface 140. Predetermined codes associated with specific faults, respectively, may be stored in the memory of one or more of the ECM 106, the TCM 112, and the hybrid control module 122. The diagnostic scan tool may scan the memory for stored codes. Stored codes may be used to determine a source of a diagnosed fault and aid a service provider in servicing the vehicle 102.

For another example, a diagnostic test module 160 may interface the network 130 via the vehicle diagnostic interface 140. The diagnostic test module 160 may interface the network 130 to, for example, verify the performance of (i.e., test) one or more diagnostic modules that selectively diagnose faults during normal vehicle operation. Generally, the performance of such diagnostic modules may be tested by electrically disconnecting a component and inserting data indicative of a fault at a location where the disconnected component would normally input data. If a diagnostic module fails to diagnose a fault when the inserted data is presented, the diagnostic module may be faulty.

Testing of some diagnostic modules, however, may be difficult due to one or more components being integrated within a housing. For example only, testing of a diagnostic module of the TCM 112 (see FIG. 2) may be difficult or impractical when the TCM 112 is located within the transmission 110. While the present disclosure will be discussed as it relates to the diagnostic module of the TCM 112, the principles of the present disclosure are applicable to other diagnostic modules.

The diagnostic test module 160 selectively requests testing of the diagnostic module. More specifically, the diagnostic test module 160 requests testing of the diagnostic module for a predetermined fault. The diagnostic module stores a predetermined code when the fault is diagnosed. The diagnostic test module 160 may also request testing of the diagnostic module for other faults. The testing of the diagnostic module for other faults may be requested in a predetermined order, a random order, or another suitable order. When a request for testing of the diagnostic module is requested, the diagnostic test module 160 may also generate an encrypted key.

The key and the request may be provided to the TCM 112 via the network 130. Before performing the request, the TCM 112 may verify that the key is authentic. For example only, the TCM 112 may compare the key to one or more predetermined keys that are known to be authentic. The TCM 112 may proceed with testing the diagnostic module when the key is authentic.

The TCM 112 may retrieve a routine that corresponds to the fault. For example only, the routine may include one or more actions to be taken that should, if the diagnostic module is functioning properly, cause the diagnostic module to diagnose the presence of the fault and set the predetermined code. More specifically, the routine may call for insertion of predetermined fault data that should cause the diagnostic module to diagnose the fault and set the predetermined code.

The location where the predetermined fault data may be inserted may be based on a type of the fault. The diagnostic module may diagnose two or more types of faults, such as an electrical fault, a performance fault, and other suitable types of faults. The diagnostic module may diagnose the presence of an electrical fault when a component electrically malfunctions. For example only, the diagnostic module may diagnose an electrical fault when a component is in an open circuit state or a in a short circuit state. The diagnostic module may diagnose a performance fault when a component exhibits faulty performance. For example only, the diagnostic module may diagnose a performance fault when a component is in a stuck state.

The diagnostic module receives the predetermined fault data and selectively diagnoses the fault based on the predetermined fault data. The diagnostic module selectively sets the predetermined code based on whether the predetermined fault data is indicative of a fault. The diagnostic module may also diagnose one or more other faults simultaneously.

The diagnostic module may take one or more remedial actions when a fault is diagnosed. For example only, the diagnostic module may store the predetermined code associated with the fault in the memory. The diagnostic module may also illuminate a malfunction indicator lamp (MIL) and/or take other remedial action(s) when a fault is diagnosed.

Figure 2:
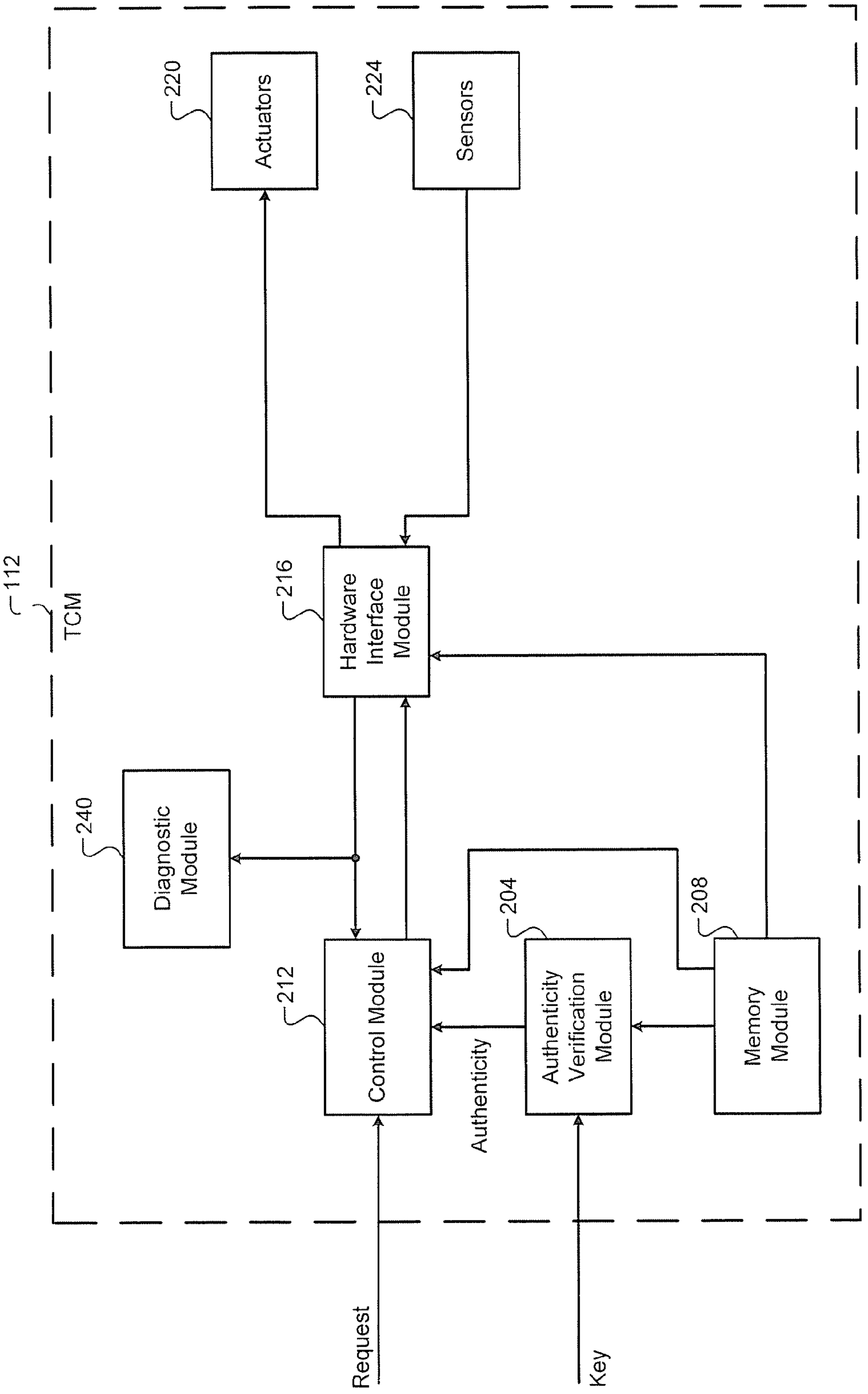
FIG. 2 is a functional block diagram of an exemplary transmission control module according to the principles of the present disclosure.

Referring now to FIG. 2, a functional block diagram of an exemplary implementation of the TCM 112 is presented. The TCM 112 may include an authenticity verification module 204, a memory module 208, a control module 212, and a hardware interface module 216. The TCM 112 may also include one or more integrated actuators 220, one or more integrated sensors 224, and one or more connectors (not shown). The TCM 112 may also include a diagnostic module 240.

The authenticity verification module 204 may receive the key generated by the diagnostic test module 160 and may determine whether the key is authentic. The authenticity verification module 204 may, for example, compare the key with predetermined authentic keys to determine whether the key is authentic. The predetermined authentic keys may be stored in the memory module 208 or in another suitable location. The authenticity verification module 204 may generate an authenticity signal indicating whether the key is authentic. For example only, the authenticity verification module 204 may set the authenticity signal to an active state (e.g., 5 V) when the key is authentic.

The control module 212 may receive the request for testing of the diagnostic module 240. The request may indicate a fault that is associated with a predetermined code. The control module 212 may retrieve a routine for testing the diagnostic module 240 as it relates to the fault. For example only, the control module 212 may retrieve the routine from the memory module 208 or another suitable location within the vehicle 102. The control module 212 may wait for the key to be authenticated before executing the routine.

The hardware interface module 216 serves as an I/O interface between the control module 212 and the components integrated within the TCM 112. For example only, the components integrated within the TCM 112 may include the actuators 220, the sensors 224, the connectors, and other components. The actuators 220 may include, for example, solenoids, switches, valves, and other suitable actuators. The sensors may include, for example, temperature sensors, pressure sensors, position sensors, speed sensors, and other suitable sensors. The connectors may include hydraulic fluid connectors, electrical connectors, and other suitable connectors.

The hardware interface module 216 may receive commands for controlling actuation of one or more of the actuators 220 from the control module 212. The hardware interface module 216 may adapt the commands based on one or more characteristics and behaviors. The characteristics and behaviors may include, for example, input voltage, noise, switching speed, power consumption, steady-state behavior, effects of loading, and other suitable characteristics and behaviors.

The hardware interface module 216 may include one or more drivers, one or more ASICs, one or more high speed data (HSD) controllers, and/or one or more other suitable actuator controllers. For example only, a driver may supply signals to an ASIC or a HSD controller based on the adapted commands. The ASIC or HSD controller may control actuation of an associated actuator based on the signal. The ASIC or HSD controller may also provide data to the hardware interface module 216 for use by the hardware interface module 216, the control module 212, and/or other modules. The ASIC or HSD controller may use data from the associated actuator, for example, in performing closed-loop control of the actuator.

The sensors 224 each measure a parameter and output a signal (e.g., analog) based on that parameter. The sensors 224 may transmit the signals to the hardware interface module 216, and the hardware interface module 216 may translate each of the signals into an associated parameter (e.g., a digital value). For example only, a speed sensor may generate pulses as teeth, respectively, of a toothed wheel that rotates with a shaft (e.g., transmission input shaft, transmission output shaft, etc.) pass the speed sensor. The hardware interface module 216 may translate the pulses generated into a digital value corresponding to the rotational speed (e.g., transmission input shaft speed, transmission output shaft speed, etc.).

The hardware interface module 216 may also adapt the parameters based on one or more characteristics and behaviors of the integrated components. The characteristics and behaviors may be similar or identical to those accounted for above. The hardware interface module 216 may provide the parameters to the control module 212 and/or other modules.

The diagnostic module 240 may also receive data provided to the control module 212 and may selectively diagnose faults in the components integrated within the TCM 112 based on the data. More specifically, the diagnostic module 240 may selectively diagnose the presence of one or more faults based on the data. The diagnostic module 240 may simultaneously determine whether one or more faults are present.

Each fault that may be diagnosed by the diagnostic module 240 may be referred to as being of a type of fault. For example only, a fault diagnosed by the diagnostic module 240 may be referred to as an electrical fault, a performance fault, or another suitable type of fault. Electrical faults may be diagnosed when a component electrically malfunctions, while performance faults may be diagnosed when an electrical component exhibits faulty performance. For example only, an electrical fault may be diagnosed in a component when the component is in an open circuit state or a short circuit state. By way of contrast only, a performance fault may be diagnosed when, for example, a component is in a stuck state (e.g., the torque converter clutch, a solenoid, etc.). Each fault diagnosed may be associated with a predetermined code.

When testing of the diagnostic module 240 is requested by the diagnostic test module 160, the hardware interface module 216 inserts predetermined fault data associated with the predetermined code or fault. The predetermined fault data may be known to cause the diagnostic module 240 to diagnose the fault and to set the predetermined code in the memory when the diagnostic module 240 is functioning properly.

The hardware interface module 216 may select an insertion location for the predetermined fault data based on the type of the fault. For example only, the hardware interface module 216 may insert the predetermined fault data at the interface between the hardware interface module 216 and the integrated components when the predetermined fault data is to be used in determining whether an electrical fault is present. In other words, the hardware interface module 216 may disregard signals received at the interface from one or more of the integrated components and use the predetermined fault data as if it was received at the interface when the diagnostic module 240 is to determine whether an electrical fault is present based on the predetermined fault data.

The hardware interface module 216 may insert the predetermined fault data at the interface between the hardware interface module 216 and the control module 212 when the predetermined fault data is to be used in determining whether a performance fault is present. In other words, the hardware interface module 216 may output the predetermined fault data as if it were provided based on signals received from integrated components when the diagnostic module 240 is to determine whether a performance fault is present based on the predetermined fault data.

When the diagnostic module 240 is functioning properly, the diagnostic module 240 selectively diagnoses the presence of the fault based on the predetermined fault data and sets the predetermined code. For example only, the diagnostic module 240 may selectively diagnose the presence of the fault based on a comparison of the predetermined fault data and one or more predetermined fault criteria. The diagnostic module 240 may also illuminate the MIL and/or perform one or more remedial actions when the fault is present. In this manner, a user of the diagnostic test module 160 may readily (e.g., visually) verify whether the diagnostic module 240 is functioning properly. In other implementations, the TCM 112 may transmit a signal to the diagnostic test module 160 indicating whether the diagnostic module 240 is functioning properly. The diagnostic test module 160 may, for example, display whether the diagnostic module 240 is functioning properly and the predetermined code.

The control module 212 may monitor the response of the diagnostic module 240 to the insertion of the predetermined fault data. The control module 212 may selectively diagnose a fault in the diagnostic module 240 based on the response of the diagnostic module 240 to the predetermined fault data. More specifically, the control module 212 may diagnose a fault in the diagnostic module 240 when the diagnostic module 240 fails to diagnose the fault based on the predetermined fault data. The control module 212 may allow the diagnostic module 240 a predetermined period of time to diagnose the fault before diagnosing a fault in the diagnostic module 240.

Figure 3:
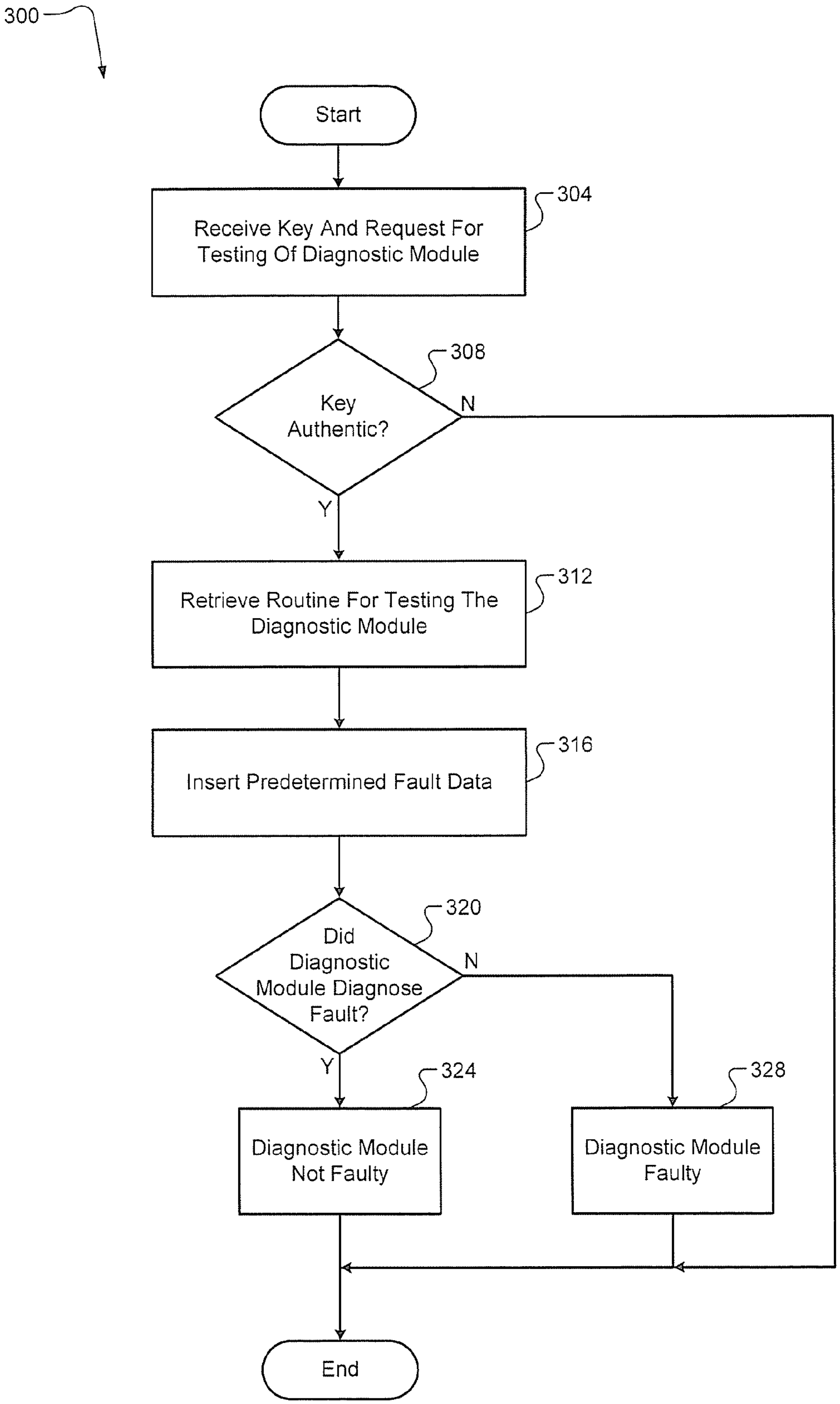
FIG. 3 is a flowchart depicting exemplary steps performed by a method according to the principles of the present disclosure.

Referring now to FIG. 3, a flowchart depicting exemplary steps 300 performed by a method is presented. Control may begin in step 304 where control receives the key and the request for testing of the diagnostic module 240. Control may determine whether they key is authentic in step 308. If true, control may proceed to step 312; if false, control may end.

Control may retrieve a routine associated with testing the diagnostic module 240 for a predetermined code and fault in step 312. Control may insert the predetermined fault data for testing the diagnostic module 240 in step 316. The predetermined fault data may cause the diagnostic module 240 to diagnose the fault and set the predetermined code when the diagnostic module 240 is functioning properly. The predetermined fault data may be retrieved as and inserted as part of the routine.

Control may determine whether the diagnostic module 240 has diagnosed the fault in step 320. If true, control may determine that the diagnostic module 240 is not faulty in step 324, and control may end. If false, control may determine that the diagnostic module 240 is faulty in step 328, and control may end. Control may insert the predetermined fault data for a predetermined period and allow the diagnostic module 240 the predetermined period to diagnose the fault. Control may take one or more remedial actions before ending, such as transmitting a signal to the diagnostic test module 160 to indicate whether the diagnostic module 240 is faulty and the predetermined code. The diagnostic test module 160 may request testing of the diagnostic module 240 as it relates to one or more other predetermined codes and faults, respectively.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system for a vehicle, comprising:

a diagnostic module that selectively diagnoses a fault in one or more of components that are integrated within a housing;

a control module that receives a request for testing of the diagnostic module and that retrieves predetermined fault data corresponding to the fault; and a hardware interface module that receives component data for the diagnosis and the predetermined fault data, that disables provision of the component data to the diagnostic module, and that provides the predetermined fault data to the diagnostic module for the diagnosis.

2. The diagnostic system of claim 1 wherein the diagnostic module selectively diagnoses the fault based on the predetermined fault data.

3. The diagnostic system of claim 1 wherein the hardware interface module selectively adjusts the predetermined fault data before providing the predetermined fault data to the diagnostic module.

4. The diagnostic system of claim 3 wherein the hardware interface module selectively adjusts the predetermined fault data when the predetermined fault data corresponds to faulty performance of one or more of the components.

5. A vehicle diagnostic system comprising:

the diagnostic system of claim 1; and a diagnostic test module that is independent of the diagnostic system and that generates the request.

6. The vehicle diagnostic system of claim 5 wherein the diagnostic system further comprises a diagnostic interface, and wherein the diagnostic test module communicates the request to the diagnostic system via the diagnostic interface.

7. The vehicle diagnostic system of claim 5 wherein the diagnostic test module generates a key and transmits the key to the diagnostic system with the request, and wherein the diagnostic system verifies authenticity of the key before disabling the provision of the component data to the diagnostic module.

8. The diagnostic system of claim 1 wherein the control module selectively diagnoses a fault in the diagnostic module based on a response of the diagnostic module to the provision of the predetermined fault data.

9. The diagnostic system of claim 1 wherein the control module diagnoses a fault in the diagnostic module when the diagnostic module fails to diagnose the fault in response to the predetermined fault data.

10. The diagnostic system of claim 1 wherein the diagnostic module illuminates a malfunction indicator lamp when the fault is diagnosed.

11. A diagnostic method for a vehicle, comprising:

selectively diagnosing a fault in one or more of components that are integrated within a housing a diagnostic module;

receiving a request for testing of the diagnostic module;

retrieving predetermined fault data corresponding to the fault;

receiving component data for the diagnosing and the predetermined fault data;

disabling provision of the component data to the diagnostic module; and providing the predetermined fault data to the diagnostic module for the diagnosing.

12. The diagnostic method of claim 11 further comprising selectively diagnosing the fault based on the predetermined fault data.

13. The diagnostic method of claim 11 further comprising selectively adjusting the predetermined fault data before providing the predetermined fault data to the diagnostic module.

14. The diagnostic method of claim 13 further comprising selectively adjusting the predetermined fault data when the predetermined fault data corresponds to faulty performance of one or more of the components.

15. The diagnostic method of claim 11 further comprising receiving the request from a diagnostic test module that is independent of the vehicle.

16. The diagnostic method of claim 15 further comprising receiving the request from the diagnostic test module at a diagnostic interface of the vehicle.

17. The diagnostic method of claim 15 further comprising:

receiving a key from the diagnostic test module; and verifying authenticity of the key before the disabling the provision of the component data to the diagnostic module.

18. The diagnostic method of claim 11 further comprising selectively diagnosing a fault in the diagnostic module based on a response of the diagnostic module to the provision of the predetermined fault data.

19. The diagnostic method of claim 11 further comprising diagnosing a fault in the diagnostic module when the diagnostic module fails to diagnose the fault in response to the predetermined fault data.

20. The diagnostic method of claim 11 further comprising illuminating a malfunction indicator lamp when the fault is diagnosed.

* * * * *